US005777429A

United States Patent [19]

Headley

[11] Patent Number: 5,777,429

[45] Date of Patent: Jul. 7, 1998

[54] DEVICE FOR CORRECTION OF NEGATIVE DIFFERENTIAL COMA ERROR IN CATHODE RAY TUBES

[75] Inventor: Kent L. Headley, San Diego, Calif.

[73] Assignees: Sony Corporation, Tokyo, Japan; Sony Electronics Inc., Park Ridge, N.J.

[21] Appl. No.: 605,695

[22] Filed: Feb. 22, 1996

[51] Int. Cl.[6] .............................. H01J 29/70; H01F 7/00; H04N 5/645

[52] U.S. Cl. .......................... 313/440; 335/210; 335/211

[58] Field of Search ..................................... 313/440, 413, 313/431; 335/210, 212, 213, 211; 358/248

[56] References Cited

U.S. PATENT DOCUMENTS

| | | | |
|---|---|---|---|
| 3,946,266 | 3/1976 | Saito et al. | 313/442 |
| 4,041,428 | 8/1977 | Kikuchi et al. | 335/210 |
| 4,063,134 | 12/1977 | Iida | 315/371 |
| 4,122,422 | 10/1978 | Hasegawa et al. | 335/213 |
| 4,556,819 | 12/1985 | Chen et al. | 313/413 |
| 4,933,596 | 6/1990 | Yoshii et al. | 313/440 |
| 5,177,411 | 1/1993 | Kii | 315/368.18 |
| 5,258,734 | 11/1993 | Tamai et al. | 335/213 |
| 5,306,982 | 4/1994 | Maillot et al. | 313/440 |
| 5,367,230 | 11/1994 | Iguchi et al. | 313/414 |
| 5,408,159 | 4/1995 | Maillot et al. | 313/440 |

OTHER PUBLICATIONS

"Designing self-converging CRT deflection yokes", Information Display, Jan., 1992, vol. 8, No. 1.

*Primary Examiner*—Sandra L. O'Shea
*Assistant Examiner*—Joseph Williams
*Attorney, Agent, or Firm*—Lise A. Rode, Esq.; Jerry A. Miller

[57] ABSTRACT

A device for correction of negative differential coma error in convergence free deflection yokes. The deflection yoke encloses a portion of a cathode ray tube, including a portion of the cathode ray tube neck, and includes: a separator around which is wound a horizontal deflection coil for providing a horizontal magnetic deflection field; a core around which is wound a vertical deflection coil for providing a vertical magnetic deflection field, the core partially encircling the separator; and a rear cover which attaches the deflection yoke to the cathode ray tube, the rear cover being disposed around the neck of the cathode ray tube and having a first side facing the direction of the screen of the cathode ray tube and resting against a rear end of the separator. In accordance with the present invention, arcuate shunts, which are preferably "C"-shaped and have inside radii which are parallel to the neck of the cathode ray tube, are disposed on the first side of the rear cover, and are preferably centered on a first axis of the neck of the cathode ray tube, such axis being parallel to an axis of the screen of the cathode ray tube. The use of these "C"-shaped shunts is found to correct the negative differential coma error introduced by the convergence free deflection yoke.

33 Claims, 6 Drawing Sheets

DEVICE FOR CORRECTION OF NEGATIVE DIFFERENTIAL COMA ERROR IN CATHODE RAY TUBES

BACKGROUND OF INVENTION

1. Field of the Invention

This invention relates to deflection yokes. More particularly, it relates to a deflection yoke device for correction of negative differential coma error in color cathode ray tubes.

2. General Background

It is known that in cathode ray tube (CRT) devices, such as those included in certain television receivers, images are formed by scanning a beam of electrons across a photon-emitting (e.g., phosphorescent) surface according to video signals input to one or more electron guns. In color CRTs, there may be three in-line electron guns, one each providing the red, green and blue video signals, or a multi-beam single electron gun having three cathodes for providing such signals. Various color images are thus formed by differing compositions of these red, blue and green signals. A deflection yoke having two pairs of coils, is preferably disposed around the funnel end of the cathode ray tube, one coil pair each to deflect the electron beams with the right frequencies both in the horizontal direction (the horizontal or "line" coil) and vertical direction (the vertical or "frame" coil). The thus deflected electron beams impinge on phosphor dots on the CRT screen, resulting in a displayed video image.

Deflection yokes may be divided into three categories: Self-convergence (SC) or convergence-free (CFD) deflection yokes, non-self-converging (NSC) or non-convergence-free (non-CFD) deflection yokes, and pin-free deflection (PFD) yokes. The primary difference between the three types of deflection yokes is the amount of correction for errors and distortions that is accomplished by the deflection yoke itself, without the aid of additional corrective circuitry. For example, the main difference between the non-convergence-free (non-CFD) deflection yoke and the convergence-free (CFD) yoke, is that the former includes a circuit known as a dynamic convergence circuit for correcting certain errors and distortions which will result in the image displayed on the CRT screen if left uncorrected. Conversely, the convergence-free (CFD) deflection yoke (see, for example, deflection yoke 20, FIGS. 1*a*–1*c*) does not include such a circuit, and corrections of the aforementioned errors and distortions in the CRT image are generally accomplished via manipulation of the deflection yoke's horizontal coil wires. (Even with the CFD deflection yoke, there is still a certain residual distortion that must be taken care of through external devices. However, the pin-free deflection (PFD) yoke corrects for all errors and distortions without the aid of any external corrective devices).

Although the dynamic convergence circuit provides good correction of the certain aforementioned misconvergences and errors, it adds additional cost. It is therefore often desirable to eliminate the dynamic convergence circuit and provide a "convergence-free" (CFD) deflection yoke.

It has also been found to be economical, and thus desirable, to be able to use the same television chassis for more than one type of deflection yoke; for example, in the case of the present invention, it was found economical for a given television chassis to be capable of driving both a non-CFD deflection yoke and a CFD deflection yoke. Thus it is desirable to provide a CFD deflection yoke which would be interchangeable with a non-CFD deflection yoke within the same television chassis, and thus capable of being driven by the same television chassis.

However, as will be discussed in detail in the forthcoming paragraphs, such interchangeability mandates that the deflection sensitivity and static electrical parameters of both deflection yokes be essentially identical, thus also mandating that the geometry of both deflection yokes, and coils, be identical. This was found to impose several restrictions on the design of the interchangeable deflection yoke as explained in the following paragraphs. (Although the following discussion will be held with respect to the interchangeability of a CFD with a non-CFD deflection yoke, it will be understood that the device of the present invention is not so limited, and may be used in any of the above-discussed types of deflection yokes, and/or in any situation where it is desired that one deflection yoke be interchangeable with another deflection yoke within the same television chassis).

As briefly mentioned above, various factors, if left uncorrected, will result in errors and distortions in the resulting image displayed on the CRT screen. For example, if a uniform field (generally formed of the first harmonic of a particular frequency) is provided by both the vertical and horizontal coils 25, 30, respectively, the resulting geometric raster will be pincushion-shaped in both the north/south (N/S) 45 and east/west (E/W) 50 directions, as a direct result of the non-linear properties of magnetic deflection and the shape of the CRT screen 40 (FIG. 2). Additionally, under the presence of a uniform magnetic field, the red and blue beams 52, 54, respectively, which are converged at the center 55 of the CRT screen 40 will be caused to over-converge at the 3 and 9 (3/9) o'clock positions, (60,65, respectively), and 6 and 12 (6/12) o'clock positions (70,75, respectively) (FIGS. 2 and 3). This condition is termed average horizontal Red-Blue (or APH) misconvergence at the 3/9 o'clock position, and average vertical Red-Blue (or APV) misconvergence at the 6/12 o'clock position. The pattern due to the misconvergence of the red and blue beams 52, 54, at the 3/9 o'clock position 60,65 (which is most relevant in terms of the present invention) is shown in FIG. 4. (The dashed lines diagrammatically represent the pattern due to the red beam 52, while the solid line diagrammatically represents the pattern due to the blue beam 54). In order to converge the red and blue beams 52, 54 at the 3/9 o'clock position 60,65, the red beam 52 must be deflected more than the blue beam 54 along the x-axis, and therefore must be subjected to a stronger magnetic field.

In general, correction of both the 3/9 misconvergence and N/S pincushion of the geometric raster is accomplished by the introduction of a horizontal pincushion-shaped magnetic field (FIG. 5), wherein the strength of the field increases along the x-axis of the deflection yoke in the direction of the arrows as shown in FIG. 5. As alluded to above, in non-CFD deflection yokes, such field may be created through the use of a dynamic quadrapole which is included in a dynamic convergence circuit. As known to those skilled in the art, the dynamic quadrapole is driven with a current having an essentially parabolic-shaped envelope to provide varying amounts of correction over different parts of the raster as necessary.

However, again, in CFD deflection yokes (such as that shown in FIGS. 1*a*–1*c*), there is no dynamic convergence circuit, and the only way to create the foregoing pincushion field, and thus correct for APH misconvergence, is by manipulation of the horizontal coil wires into or away from the x-axis (see, FIG. 1*c*). Generally, movement of the winding distribution of the windings of the horizontal coil 30 away from the x-axis and towards the y-axis creates a barrel-shaped field; conversely, moving the winding distribution away from the y-axis and towards the x-axis creates a more pincushion shaped field.

One difficulty encountered in correction of errors and misconvergences in a CFD deflection yoke, is that as, ordinarily, the only manner by which to correct the APH misconvergence is to manipulate the horizontal windings to create the necessary pincushion field, once the APH misconvergence has been corrected, an additional misconvergence is introduced, which must be corrected separately. More specifically, it will be appreciated by those skilled in the art that the introduction of such a horizontal pincushion-shaped field tends to result in the underdeflection of the green beam (G) 53 as compared with the average deflection of the red and blue beams (APH) 80, resulting in a displayed pattern as shown in FIG. 7. This misconvergence of the green beam 53 with respect to the average convergence of the red and blue beams, 80, is known alternatively as "coma", or "horizontal center raster misconvergence" (HCR).

Lastly, there are two other misconvergence parameters, known in the art as the CCV (corner cross vertical) misconvergence and YBH (Y-bow horizontal) misconvergence, which, in conjunction with the APH misconvergence, are interdependent misconvergences which must also be corrected. (Of course there are other distortions and misconvergences which may occur, but the above-discussed are most relevant for purposes of the present invention). In general, the deflection yoke designer attempts to minimize these parameters by altering the geometry (e.g., length, diameter, etc.) and relative positions of the deflection yoke coils.

The above-discussed methods of correction of the APH misconvergence and the misconvergence due to the interdependent CCV/YBH/APH necessitate altering the deflection yoke coil geometries and/or positions in some manner. However, such methods run in direct contradiction to the interchangeability requirement of the present invention; i.e., that the static electrical and deflection sensitivity parameters of the CFD and non-CFD deflection yokes be essentially identical, and thus that the geometry of the CFD and non-CFD deflection yokes, and coils, be identical.

Thus, in the present invention, in order to correct the these misconvergences, without changing the deflection coil geometries as would ordinarily be done, it was found to be necessary to move the deflection yoke core 85 (and thus vertical coil 25) (see, FIGS. 1*a*–1*c*) approximately one millimeter (1 mm) over the separator 90 towards the funnel end 92 of the CFD deflection yoke 20.

However, in moving the core 85 and the vertical coil 25 towards the funnel end 92 of the deflection yoke 20, occasioned a significant increase in HCR misconvergence. Additionally, it was discovered that the HCR misconvergence was approximately one millimeter (1 mm) more negative (i.e., greater) in the corners of the screen than on the x-axis (FIG. 7), creating a negative differential error, or ΔHCR. (As shown in FIG. 7, the dashed line diagrammatically represents the pattern due to HCR, while the alternating dashed/dotted line diagrammatically represents the pattern due to the HCR when the core 85 was moved toward the funnel end 92 of deflection yoke 20. As seen in FIG. 7, HCR is greater, or more "negative" in the corners of the screen 40. This is ΔHCR 95).

Several prior art devices and methods have been proposed to correct HCR, including manipulation of the winding distribution of the horizontal coil, use of a dynamic hexapole (or "coma coil"), and rectangular permeable shunts disposed between the rear cover and rear of the separator of a deflection yoke. However, it was found that none of these proposed corrective devices/methods could be used to correct ΔHCR in the present invention.

Thus it would be desirable to provide a device which could correct differential negative coma error caused by a deflection yoke which is interchangeable with another deflection yoke within the same television chassis; in particular, it would be desirable to provide a device which could correct differential negative coma error caused by a CFD deflection yoke which is interchangeable with a non-CFD deflection yoke within the same television chassis, and thus capable of being driven by the same television chassis.

SUMMARY OF INVENTION

Accordingly, it is one object of the invention to provide a novel deflection yoke.

It also an object of the invention to provide a less expensive deflection yoke.

It is another object of the invention to provide a deflection yoke which is interchangeable with a non-CFD deflection yoke within the same television chassis, and thus capable of being driven by the same television chassis.

It is yet another object of the invention to provide a CFD deflection yoke which is interchangeable with a non-CFD deflection yoke within the same television chassis, and has the same static electrical and deflection sensitivity parameters as the non-CFD deflection yoke.

It is a further object of the invention to provide a device for a deflection yoke which is interchangeable with a non-CFD deflection yoke within the same television chassis, the device being capable of correcting various misconvergences resulting from this interchangeable CFD deflection yoke, including negative differential coma error (ΔHCR).

It is still another object of the invention to provide a deflection yoke which is interchangeable with a non-CFD deflection yoke within the same television chassis, and which has a device which is capable of correcting various misconvergences resulting from this interchangeable CFD deflection yoke, including APH misconvergence and the misconvergence due to the interdependent CCV/YBH/APH parameters without changing the geometries of the deflection yoke and deflection yoke coils.

Therefore, in accordance with one aspect of the present invention, there is provided a device for correction of differential negative coma misconvergence of the type caused by a deflection yoke which is used for converging at a point on a photon-emitting screen, a plurality of electron beams generated by cathode ray tube, the cathode ray tube having a screen and a neck extending in a direction away from the screen. The deflection yoke encloses a portion of the cathode ray tube, including a portion of the cathode ray tube neck, and includes a separator around which is wound a horizontal deflection coil for providing a horizontal magnetic deflection field, a core around which is wound a vertical deflection coil for providing a vertical magnetic deflection field, the core encircling the separator, and further includes a rear cover for securing the deflection yoke to the cathode ray tube, the rear cover being disposed around the neck of the cathode ray tube and having a first side facing the direction of the screen and resting against a rear end of the separator. The device generally comprises first and second arcuate shunts which preferably are "C"-shaped and are disposed on the first side of the rear cover. The first and second "C"-shaped shunts each preferably have inside radii which are parallel to the curvature of the neck of the cathode ray tube, and are also each preferably centered on a first axis of the neck of the cathode ray tube, such axis being parallel to an axis of the cathode ray tube screen.

In accordance with other aspects of the present invention, each of the first and second arcuate shunts is made of ceramic and encompasses an angle distance of up to 120° about a first axis of the neck of the cathode ray tube.

In accordance with yet other aspects of the present invention, each of the first and second arcuate shunts is disposed in a groove in the first side of the rear cover, and is affixed therein with a synthetic resin and rubber glue.

The features of the present invention believed to be novel are set forth with particularity in the appended claims. However, the invention itself may be best understood with reference to the following description in conjunction with the accompanying drawings.

DETAILED DESCRIPTION OF THE INVENTION

Figure 1A:
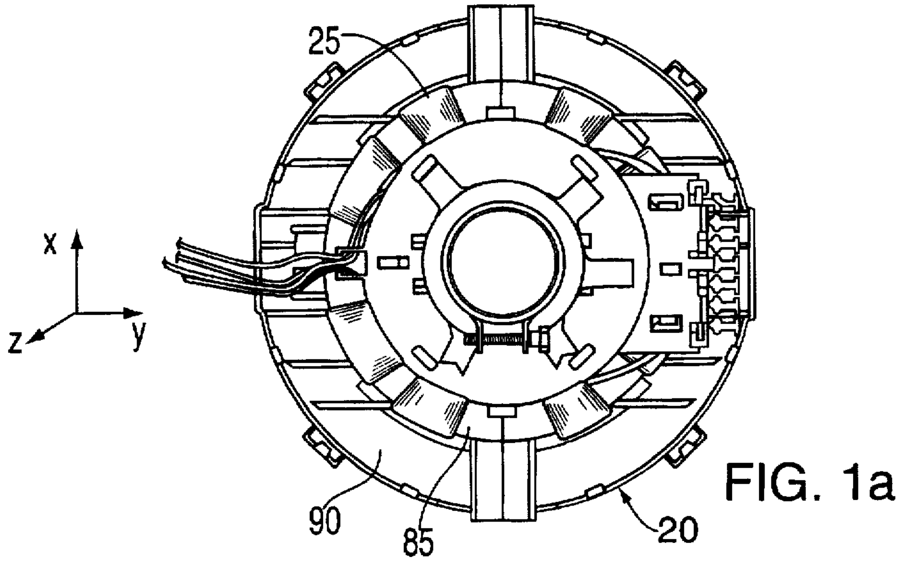
FIGS. 1*a* to 1*c* are, respectively, a rear elevational views of a deflection yoke of the type used with the device of the present invention, as viewed from the end of the yoke which is intended to face the electron gun assembly of a cathode ray tube, a side elevational view of such deflection yoke, and a front elevational view of such deflection yoke.

As stated previously, it was desired that one type of deflection yoke be interchangeable with another type of deflection yoke within the same television chassis, and, specifically in the present invention, that both a non-CFD deflection yoke and a CFD deflection yoke would be capable of being driven by the same television chassis, and thus interchangeable. Again, however, such interchangeability mandates that the static electrical and deflection sensitivity parameters of the CFD and non-CFD deflection yokes be essentially identical, thus also mandating that the geometry of the CFD and non-CFD deflection yokes, and coils, be identical, as will be discussed in the following paragraphs. (Again, although the following discussion will be held with respect to CFD and non-CFD deflection yokes, it will be understood that the device of the present invention is not so limited, and may be used in any of the above-discussed types of deflection yokes, and/or in any situation where it is desired that one deflection yoke be interchangeable with another deflection yoke within the same television chassis).

In certain devices, such as 32" television receivers, the deflection yoke is part of a deflection circuit, the latter of which is a tuned inductive circuit. As part of this tuned circuit, the deflection circuit "sees" the deflection yoke as a combination of inductances and resistances, and thus it is these values which are the most important parameters of the deflection yoke in terms of the deflection circuit. In particular, the power consumption, linearity and deflection sensitivity of the deflection circuit are directly related to the deflection yoke's inductance values. If, for example, a non-CFD deflection yoke having a particular deflection sensitivity were to be replaced in the same television chassis with a CFD deflection yoke (see, e.g., FIGS. 1*a*–1*c*) having a deflection sensitivity which is greater than that of the non-CFD deflection yoke (i.e., the CFD deflection yoke required less power to deflect the electron beams across the CRT screen), that part of the television chassis which dynamically adjusts raster size might not be capable of controlling the over-deflection of the electron beams, and thus not capable of creating a raster which is small enough to fit on the CRT screen. Thus it will be appreciated that the deflection sensitivity of the CFD and non-CFD deflection yokes must be the same.

Furthermore, a requirement regarding identical deflection sensitivities imposes important restrictions on any changes in the geometry of the CFD deflection yoke over the non-CFD deflection yoke. More specifically, it is known that deflection sensitivity is a function of several parameters, including the length, thickness, and volume of the coil (or coils) in this case, of the deflection yoke; and, thus, any alteration in the values of these parameters will affect deflection sensitivity. As stated previously, however, this is undesired if the two deflection yokes (CFD and non-CFD) are to be driven by the same television chassis. Thus, in order for a CFD deflection yoke to be interchangeable with a non-CFD deflection yoke within the same television chassis, and to be driven by the same television chassis, it is required that the deflection sensitivity of the CFD and non-CFD deflection yokes must be the same, and that the coil geometry of the CFD deflection yoke should be essentially identical to that of the non-CFD yoke.

Figure 4:
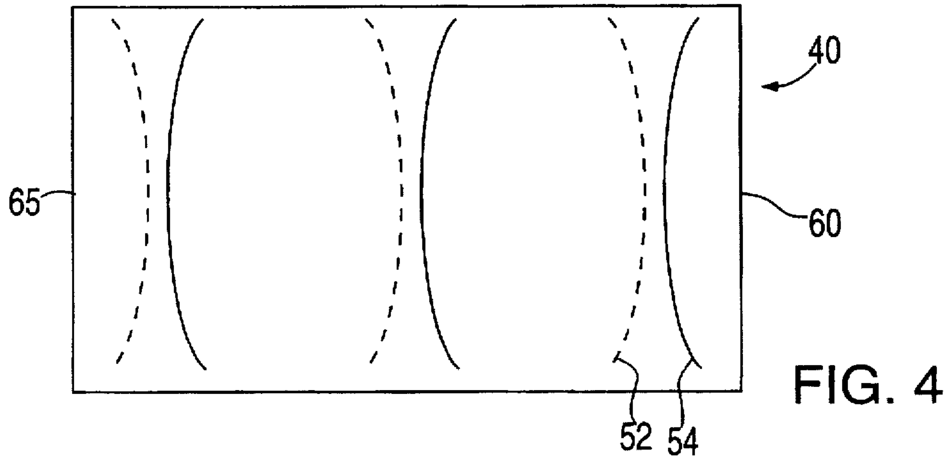
FIG. 4 shows a diagram representing the pattern on a cathode ray tube screen resulting from the APH misconvergence of FIG. 4.
Figure 5:
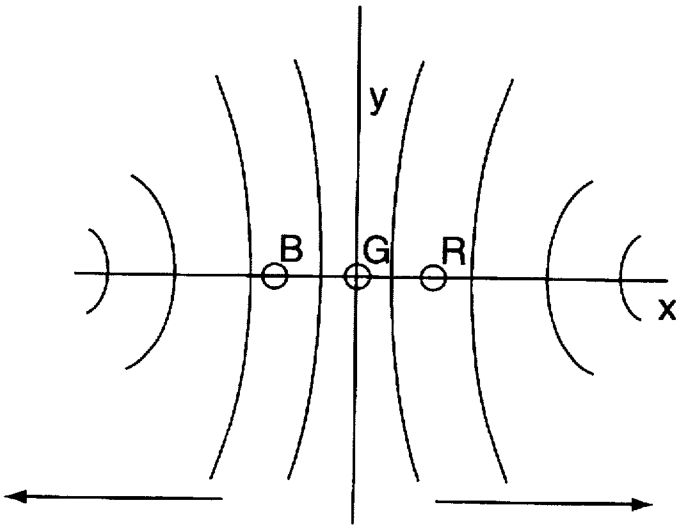
FIG. 5 shows a diagram illustrating the configuration and intensity of a pincushion magnetic field.

However, again, it is known that the only way to create the necessary horizontal pincushion field for correcting the average horizontal Red-Blue (APH) misconvergence (see, FIG. 4) created by a CFD deflection yoke, is by the manipulation of the horizontal coil wires to and away from the x- and y-axes. Again, generally, movement of the winding distribution of the horizontal coil away from the x-axis and towards the y-axis creates a barrel-shaped field; conversely, moving the winding distribution away from the y-axis and towards the x-axis creates a more pincushion shaped field. Additionally, as set forth previously, the introduction of a horizontal pincushion-shaped field tends to result in the horizontal center raster misconvergence, or HCR).

One difficulty encountered in correction of errors and misconvergences in a CFD deflection yoke (e.g., FIGS. 1*a*–1*c*), is that, as ordinarily, the only manner by which to correct the APH misconvergence is to manipulate the horizontal windings 30 to create the necessary pincushion field, once the APH misconvergence has been corrected, the resulting HCR misconvergence is "fixed", and must be corrected separately. However, as stated previously, because of the requirement that deflection sensitivity, and thus deflection yoke and coil geometries, remain the same between the CFD and non-CFD deflection yokes, no further changes may be made in the windings of the CFD deflection yoke coil.

Furthermore, as set forth above, it has been found that there are two other misconvergence parameters, known in the art as the CCV (corner cross vertical) and YBH (Y-bow horizontal), which in conjunction with the APH misconvergence parameter are for the most part constant, and unalterable, for a given coil geometry and relative position of the horizontal and vertical coils of a deflection yoke. Each of these three parameters are interdependent, so that altering one parameter necessarily alters the other parameters. As an empirical rule of thumb, a deflection yoke designer ordinarily attempts to minimize these three misconvergences by altering the coil geometry and relative position of the horizontal and vertical coils of a deflection yoke. Again, however, because of the requirement that deflection sensitivity, and thus deflection yoke and coil geometries, remain the same between the CFD and non-CFD deflection yokes, no change may be made in the geometry windings of the CFD deflection yoke coil.

Thus, in the present invention, in order to correct the APH misconvergence and the misconvergence due to the interdependent CCV/YBH/APH parameters, without changing the deflection coil geometries as would ordinarily be done, found to be necessary to move the deflection yoke core 85 (and thus vertical coil 25) approximately one millimeter (1 mm) over the separator 95 towards the funnel end 92 of the CFD deflection yoke 20. (Although preferably the separator and core of the non-CFD deflection yoke are used to ensure identical coil geometries and thus similar deflection sensitivity, it will be appreciated that a new separator and core may be designed for the CFD deflection yoke 20, bearing in mind the constraints regarding coil geometries and the static electrical and deflection sensitivity parameters).

Figure 6:
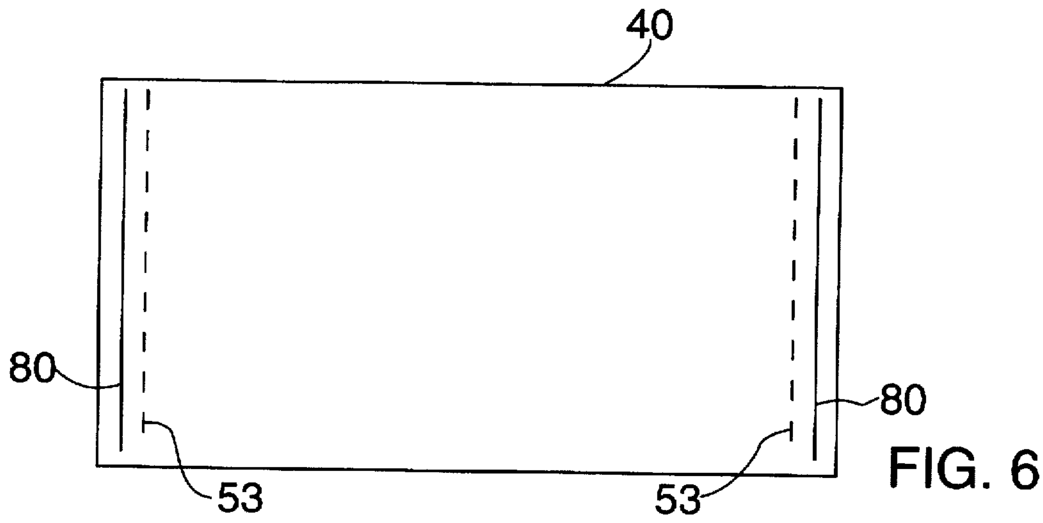
FIG. 6 shows a diagram representing the pattern on a cathode ray tube screen resulting from the underdeflection of the green beam from an electron gun assembly with respect to the average deflection of the red and blue beam from an electron gun assembly, or horizontal center raster misconvergence (HCR misconvergence), which occurs with the introduction of the pincushion magnetic field of FIG. 5.

However, moving the core 85 and thus vertical coil 25 towards the funnel end 92 of the deflection yoke 20, occasioned a significant increase in HCR misconvergence. (FIG. 6) That is, the HCR misconvergence became more negative. This increase in HCR misconvergence occurs as a result of the fact that as a vertical coil 25 is moved towards the front of a deflection yoke 20, (i.e., towards the funnel end 92), the stray field emanating from the vertical coil 25 is lessened. Ordinarily, it is this stray vertical field which is used to decrease HCR misconvergence. Thus, moving the core 85 and vertical coil 25 towards the front of the deflection yoke 20 lessens the stray field available to correct HCR misconvergence, and the latter necessarily increases.

Figure 7:
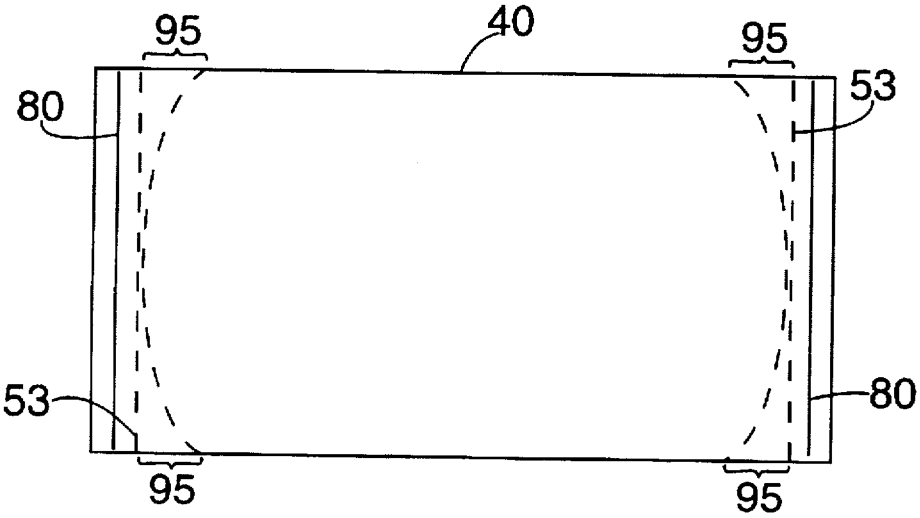
FIG. 7 shows a diagram representing the pattern on a cathode ray tube resulting from HCR misconvergence and negative differential misconvergence, or AHCR, misconvergence, both of which occurred as a result of moving the core and vertical deflection coil of the deflection yoke of the present invention over the separator of such deflection yoke.

In addition to overall increased HCR misconvergence, however, it was discovered that the HCR misconvergence was approximately one millimeter (1 mm) more negative (i.e., greater) in the corners of the screen than on the x-axis (FIG. 7), creating a differential error, or ΔHCR 95. Such a differential error does not occur frequently during the design of deflection yokes, and arises, in part, as an indirect result of the requirement that the CFD deflection yoke 20 have both identical deflection sensitivity and static electrical parameters as the non-CFD yoke.

Figure 8:
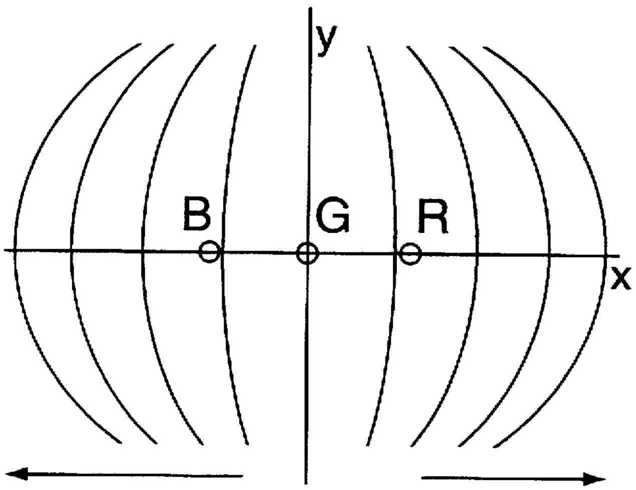
FIG. 8 shows a diagram illustrating the configuration and intensity of a barrel magnetic field.

It is known that to correct HCR misconvergence a horizontal barrel-shaped field (FIG. 8) may be introduced at the rear end of the deflection yoke 20. In the barrel-shaped field, converse to the pincushion-shaped field, the field strength decreases along the x-axis as shown by the direction of the arrows in FIG. 8. Thus, at the center of the CRT screen, the green beam 53 experiences a stronger field (and consequently larger force) that either the red or blue beams, 52,54, respectively. This effect continues along the x-axis, and therefore, the green beam 53 is deflected further along the x-axis than the red or blue beams, 52,54, respectively.

Several prior art devices and methods have been proposed to provide such barrel-shaped field. As stated previously, a first proposal would require the manipulation of the winding distribution of the horizontal coil 30. Again, movement of the winding distribution of the horizontal coil 30 away from the x-axis and towards the y-axis creates a barrel-shaped field. A second proposal would be the use of the known dynamic hexapole (or "coma coil") mounted at the top and bottom of the rear cover 35. Each coil of the dynamic hexapole is connected in series with one half of the horizontal coil 30, thus creating a barrel-shaped field with the same frequency and phase of the hexapole. As known, the amount of correction provided by the dynamic hexapole is determined by the number of turns of wire on each half of the horizontal coil 30. Last, rectangular permeable shunts may be disposed between the rear cover 35 and rear coil windings (not shown) of the separator 90 to reshape the stray vertical field and enhance the horizontal field at the rear of the deflection yoke 20.

While such proposals may be adequate in correcting HCR misconvergence, none may be used to correct ΔHCR 95 in the present invention. More particularly, while alteration of the horizontal winding distribution may be used to correct ΔHCR 95 to some degree, doing so causes unwanted effects including other misconvergences, such as APH horizontal misconvergence (FIG. 4), which can not be corrected any other way. Further alteration of the coil geometry affects the deflection sensitivity, which, as set forth previously, is undesired if the CFD yoke is to be interchangeable with the non-CFD yoke. The rectangular shunts may be used to fully correct HCR, but were generally found to have no effect on ΔHCR 95. Last, addition of a dynamic hexapole is undesirable as it adds significant cost to the deflection yoke, and, it is more difficult to manufacture, and therefore is undesirable from a manufacturing standpoint.

However, in accordance with the present invention, it was found that arcuate shunt devices 100 (FIG. 9) disposed within the rear cover 35 of the CFD deflection yoke 20 could be used to correct for the differential negative error, ΔHCR 95. More specifically, and with reference to FIGS. 10*a* to 10*c*, it was found that placement of two "C"-shaped shunt devices 100 inside the rear cover 35 of the CFD deflection yoke 20 and against the rear of the separator 90, and thus rear end-turns of the horizontal coil 30, could be used to correct for ΔHCR 95. As seen in FIGS. 10*a* to 10*c*, the arcuate shunts 100 are preferably disposed within the inside of the rear cover 35, so that when the rear cover 35 is placed over the CRT neck 105 (shown in dashed lines), the arcuate shunts 100 rest against the rear of the separator 90, and thus rear end-turns of the horizontal coil 30.

Figure 9:
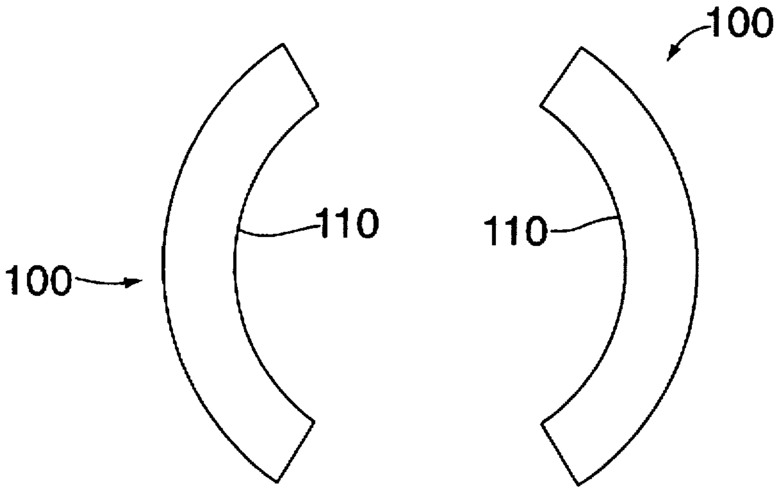
FIG. 9 shows one embodiment of the arcuate shunts of the present invention; and, FIGS. 10*a* to 10*c* show three views of the disposition of the arcuate shunts of FIG. 9 in the rear cover of the deflection yoke of FIGS. 1*a* to 1*c*, such views being, respectively, a front elevational view of the rear cover, as viewed from the end of the yoke which is intended to face away from the electron gun assembly of a cathode ray tube, a side elevational view of such rear cover, and a front elevational view of such cover, which is intended to face the electron gun assembly of a cathode ray tube.
Figure 10A:
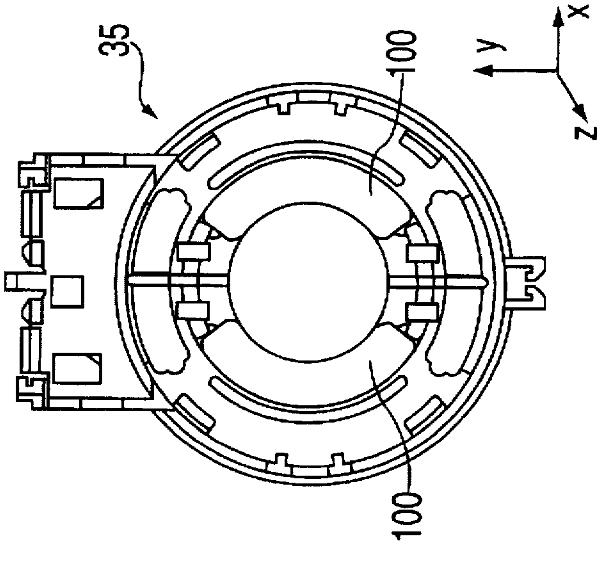
Figure 10B:
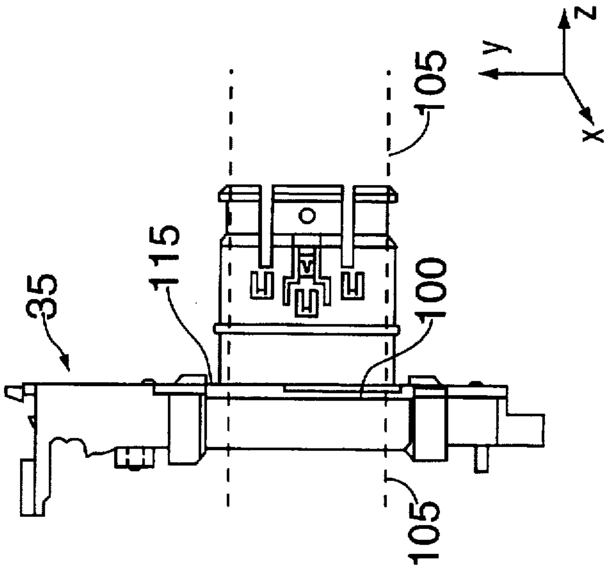
Figure 10C:
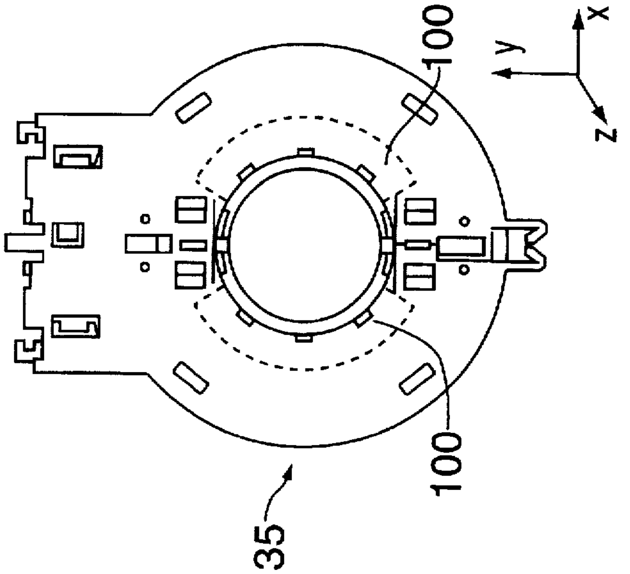

As shown in FIG. 9, each of the arcuate shunts 100 is preferably "C"-shaped, having an inside radius 110 which is preferably parallel to the curvature of the CRT neck 105. Each of the shunts 100 is also preferably centered on the X-axis (FIG. 10*a*), which is parallel to an axis of the CRT screen 40. In the case of the deflection yoke 20 shown in FIGS. 1*a* to 1*c*, each shunt 100 preferably encompasses an angle of up to 120° around the CRT neck 10 5, with 120° resulting in the optimum correction for HCR and ΔHCR 95, and thus preferable.

The arcuate shunts 100 are preferably made of a ceramic having a relative permeability value of 1000 (i.e., $\mu=1000$), such as the H4M ceramic which may be purchased from TDK Corporation, 6165 Greenwich Drive, Suite 150, San Diego, Calif., 92122. (While some cost advantage was obtained using shunts which were made from laminated steel, it was found that the such shunts provided less effective correction of ΔHCR).

In one embodiment, the arcuate shunts 100 are affixed with a synthetic resin and rubber glue (not shown) within a groove 115 of the rear cover 35 (FIG. 10*b*), but any non-metal device or other non-metal fastening methods and devices to attach the shunts 100 may be used. Similarly, although the groove 115 allows for the ready and exact placement of the shunts 100 during the manufacturing process, such groove 115 is not necessary, and the shunts 100 may be placed in a flush relationship with the rear cover 35. Acetate cloth tape (not shown) may be affixed to the top of the shunts 35 to hold them in place while the glue dries; however, it will be appreciated that such tape is not necessary to the proper operation of the present invention.

The "C"-shaped shunts 100 were found to correct ΔHCR 95 in two ways. First, by extending the curvature of the shunts 100 closely around the CRT neck 105 (FIGS. 10*a* to 10*c*), more of the aforementioned stray vertical magnetic field is captured and channeled into the corners of the CRT screen 40 where it is most needed for correction of ΔHCR 95. Additionally, the curvature of the "C"-shaped shunts 100 provides a greater barreling effect in the corners, without changing the barreling effect near the X-axis. This results in a more positive change to the horizontal coma raster in the corners of the CRT screen 40 than at the 3/9 o'clock positions, 60, 65, respectively, thus alleviating the differential error in the HCR (i.e., ΔHCR).

Thus the above arcuate shunts 100 allow for a lower-cost CFD deflection yoke which is interchangeable with a non-CFD deflection yoke within the same television chassis, the shunts 100 being capable of correcting various misconvergences resulting from a CFD deflection yoke, including APH misconvergence and the misconvergence due to the interdependent CCV/YBH/APH parameters, without requiring any alteration in the geometries of the deflection yoke and deflection yoke coils.

Figure 1B:
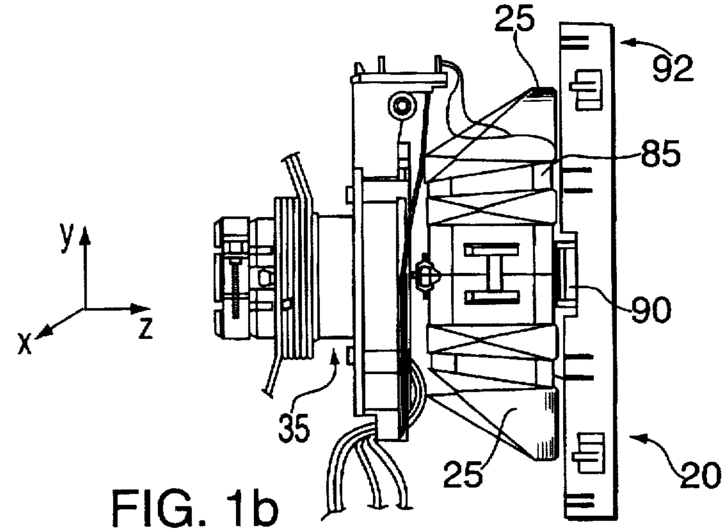
Figure 1C:
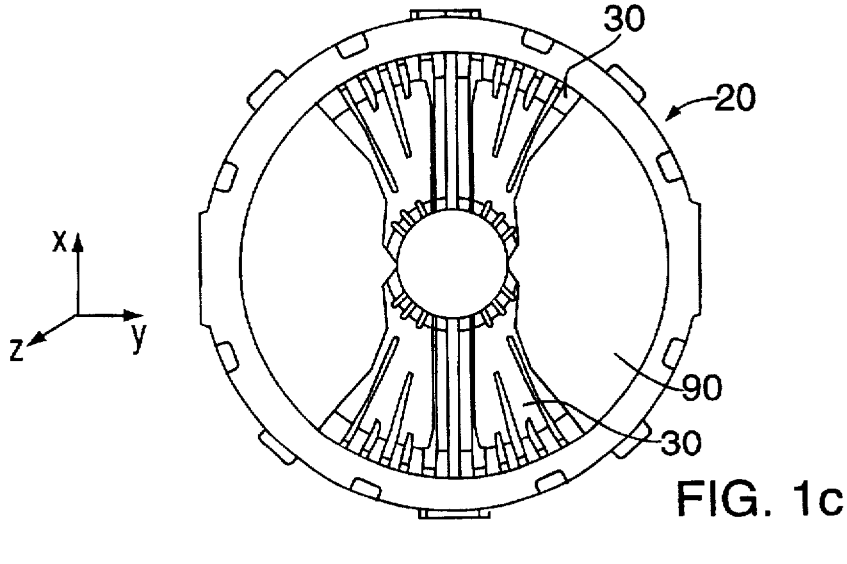
Figure 2:
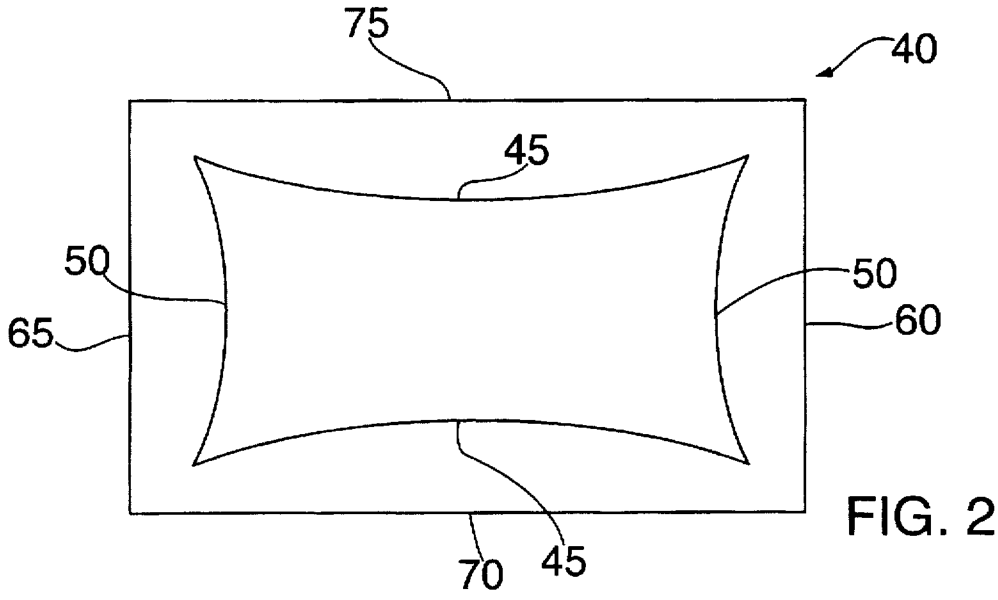
FIG. 2 shows North/South (N/S) and East/West (E/W) pincushion distortion of the geometric raster on a cathode ray tube screen.
Figure 3:
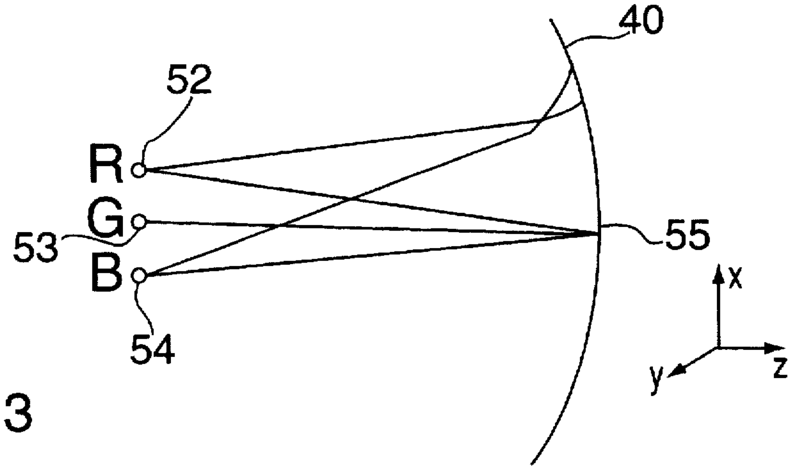
FIG. 3 shows misconvergence of the red and blue beams (APH misconvergence) from an electron gun assembly under the presence of a uniform magnetic field.
Figure 11:
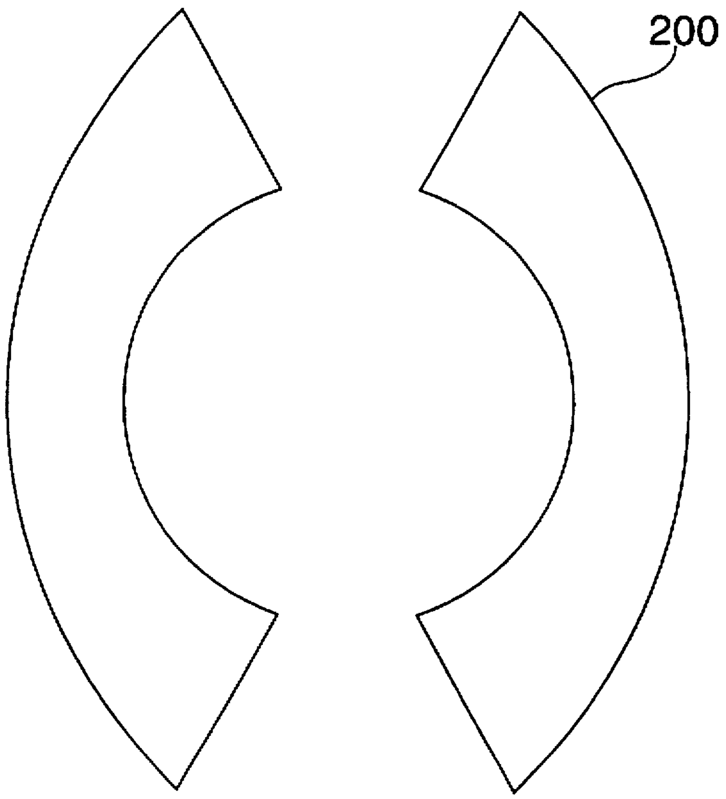
FIG. 11 shows another embodiment of the arcuate shunts of the present invention.

It will be appreciated, that while the arcuate shunts are preferably "C"-shaped and have inside radii parallel to the curvature of the CRT neck, this is not necessary to the present invention in order to provide correction of ΔHCR. For example, as seen in FIG. 11, it is expected that an arcuate shunt having an outside radius which is greater than an inside radius will provide adequate correction of ΔHCR. That is, it is expected that arcuate shunts 200 having flared distal ends to increase the barreling effect and to capture more stray vertical field, will also provide proper correction of ΔHCR with the specific deflection yoke shown in FIGS. 1*a* to 1*c*. Additionally, it is expected that arcuate shunts having inside radii which are not parallel to the curvature of the CRT neck may provide correction of ΔHCR in certain deflection yoke designs. Furthermore, it is expected that the angle around the CRT neck which each of the arcuate shunts 100 encompasses will also be dependent upon the particular design of the deflection yoke used as well as whether the inner radius 110 of each of the arcuate shunts 100 is parallel to the curvature of the neck 105 of the cathode ray tube. Thus, if a deflection yoke of a design other than that shown in FIGS. 1*a* to 1*c* is used, it may be necessary to increase or decrease the angle around the CRT neck which the arcuate shunt 100 covers. Therefore, as set forth above, while the arcuate shunts are preferably "C"-shaped and encompass a 120° angle with respect to the CRT neck, such design is not meant to be a limitation of the present invention.

It is therefore apparent that in accordance with the present invention, an embodiment that fully satisfies the objectives, aims and advantages is set forth above. While the invention has been described in conjunction with specific embodiments, it is evident that many alternatives, modifications, permutations and variations will become apparent to those skilled in the art in light of the foregoing description. For example, although the above discussion was held with respect to the interchangeability of a CFD with a non-CFD deflection yoke, the device of the present invention may be used in any type deflection yokes, and/or in any situation where it is desired that one deflection yoke be interchangeable with another deflection yoke within the same television chassis. Second, while it was found that the "C"-shaped shunts encompassing a 120° angle around the CRT neck with respect to the CRT neck center, provided the best correction of ΔHCR, it is expected that the angle around the CRT neck with respect to the center which each of the shunts encompasses will be dependent upon the particular design of the deflection yoke used, and whether the curvature of the inside radii of the shunts is parallel to that of the CRT neck, and thus the angular range set forth above is not meant to be a limitation of the present invention. Additionally, while the shunts in the present invention were affixed with a synthetic resin and rubber glue within the rear cover, any non-metal device or other non-metal methods and devices of attaching the shunts may be used. Furthermore, although the shunts used in the present invention were manufactured from H4M ceramic and provided the best correction of ΔHCR, other ceramics and similar materials may be used, such as laminated steel. Lastly, it is expected that additional flaring of the arcuate shunts at the distal ends will further enhance the correction of ΔHCR, for the reasons set forth above. Other embodiments will occur to those skilled in the art. Accordingly, it is intended that the present invention embrace all such alternatives, modifications and variations as fall within the scope of the appended claims.

What is claimed is:

1. A device for correction of differential negative coma misconvergence of the type caused by a deflection yoke which is used for converging at a point on a photon-emitting screen, a plurality of electron beams generated by cathode ray tube, said cathode ray tube having a screen and a neck extending in a direction away from said screen, wherein said deflection yoke encloses a portion of said cathode ray tube, including a portion of said cathode ray tube neck, and wherein said deflection yoke includes a separator around which is wound a horizontal deflection coil for providing a horizontal magnetic deflection field, a core around which is wound a vertical deflection coil for providing a vertical magnetic deflection field, said core encircling said separator, and wherein said deflection yoke is attached to said cathode ray tube by a rear cover, said rear cover being disposed around said neck of said cathode ray tube and having a first side facing the direction of said screen and resting against a rear end of said separator, said device comprising a plurality of arcuate shunts disposed on said first side of said rear cover for correction of negative differential coma misconvergence.

2. The device of claim 1, wherein said arcuate shunts are "C"-shaped and which each have inside radii which are parallel to said neck of said cathode ray tube.

3. The device of claim 2, wherein said "C"-shaped shunts are each centered on a first axis of said neck of said cathode ray tube, said first axis being parallel with an axis of said screen of said cathode ray tube.

4. The device of claim 1, wherein the each of said arcuate shunts encompasses up to a 120° angle around said neck of said cathode ray tube.

5. The device of claim 3, wherein each of said "C"-shaped shunts encompasses a 120° angle around said neck of said cathode ray tube.

6. The device of claim 3, wherein said deflection yoke is a convergence-free deflection yoke.

7. The device of claim 1, wherein each of said arcuate shunts is made of ceramic.

8. The device of claim 7, wherein the relative permeability of said ceramic is 1000.

9. The device of claim 1, wherein each of said arcuate shunts is made of laminated steel.

10. The device of claim 1, wherein each of said arcuate shunts is disposed in a groove in said first side of said rear cover.

11. The device of claim 10, wherein each of said arcuate shunts is affixed in said groove with a synthetic resin and rubber glue.

12. The device of claim 1, wherein each of said arcuate shunts has flared ends to further increase correction of said negative differential coma error.

13. A deflection yoke for use with a cathode ray tube including electron gun means for generating a plurality of electron beams of the type used for converging at a point on a photon-emitting screen, a plurality of electron beams generated by cathode ray tube, said cathode ray tube having a screen and a neck extending in a direction away from said screen, wherein said deflection yoke encloses a portion of said cathode ray tube, including a portion of said cathode ray tube neck, said deflection yoke comprising:

- horizontal deflection means including a separator having a front and rear end and around which is wound a horizontal deflection coil for providing a horizontal magnetic deflection field;
- vertical deflection means including a core around which is wound a vertical deflection coil for providing a vertical magnetic deflection field, said core encircling said separator;
- a rear cover attaching said deflection yoke to said cathode ray tube, said rear cover being disposed around said neck of said cathode ray tube and having a first side facing the direction of said screen and resting adjacent to/against said rear end of said separator; and,
- arcuate shunt means disposed on said first side of said rear cover for correction of differential negative coma misconvergence.

14. The deflection yoke of claim 13, wherein said arcuate shunt means comprise first and second "C"-shaped shunts each of which has an inside radius which is parallel to said neck of said cathode ray tube.

15. The deflection yoke of claim 14, wherein each of said first and second "C"-shaped shunts are centered on a first axis of said neck of said cathode ray tube, said first axis being parallel with an axis of said screen of said cathode ray tube.

16. The deflection yoke of claim 13, wherein said arcuate shunt means encompasses up to a 120° angle about said neck of said cathode ray tube.

17. The deflection yoke of claim 15, wherein each of said first and second "C"-shaped shunts encompasses a 120° angle about said neck of said cathode ray tube.

18. The deflection yoke of claim 13, wherein said arcuate shunt means is made of ceramic.

19. The deflection yoke of claim 18, wherein the relative permeability of said ceramic is 1000.

20. The deflection yoke of claim 13, wherein each of said arcuate shunt means is made of laminated steel.

21. The deflection yoke of claim 14, wherein each of said first and second "C"-shaped shunts is disposed in a groove in said first side of said rear cover.

22. The deflection yoke of claim 21, wherein each of said first and second shunts is affixed in said groove with a synthetic resin and rubber glue.

23. The deflection yoke of claim 14, wherein each of said first and second "C"-shaped shunts has flared ends to further increase correction of said differential negative coma error.

24. In a television receiver, a deflection yoke for use with a cathode ray tube including electron gun means for generating a plurality of electron beams of the type used for converging at a point on a photon-emitting screen, a plurality of electron beams generated by cathode ray tube, said cathode ray tube having a screen and a neck extending in a direction away from said screen, wherein said deflection yoke encloses a portion of said cathode ray tube, including a portion of said cathode ray tube neck, said deflection yoke comprising:

- horizontal deflection means including a separator having a front and rear end and around which is wound a horizontal deflection coil for providing a horizontal magnetic deflection field;
- vertical deflection means including a core around which is wound a vertical deflection coil for providing a vertical magnetic deflection field, said core encircling said separator;
- a rear cover attaching said deflection yoke to said cathode ray tube, said rear cover being disposed around said neck of said cathode ray tube and having a first side facing the direction of said screen and resting against said rear end of said separator; and,
- arcuate shunt means disposed on said first side of said rear cover for correction of differential negative coma misconvergence.

25. The deflection yoke of claim 24, wherein said arcuate shunt means comprise first and second "C"-shaped shunts each of which has an inside radius which is parallel to said neck of said cathode ray tube.

26. The deflection yoke of claim 25, wherein each of said first and second "C"-shaped shunts are centered on a first axis of said neck of said cathode ray tube, said first axis being parallel with an axis of said screen of said cathode ray tube.

27. The deflection yoke of claim 24, wherein said arcuate shunt means encompasses up to a 120° angle about said neck of said cathode ray tube.

28. The deflection yoke of claim 27, wherein each of said first and second "C"-shaped shunts encompasses a 120° angle about said neck of said cathode ray tube.

29. The deflection yoke of claim 24, wherein said arcuate shunt means is made of ceramic.

30. The deflection yoke of claim 29, wherein the relative permeability of said ceramic is 1000.

31. The deflection yoke of claim 24, wherein each of said arcuate shunt means is made of laminated steel.

32. The deflection yoke of claim 25, wherein each of said first and second "C"-shaped shunts is disposed in a groove in said first side of said rear cover.

33. The deflection yoke of claim 32, wherein each of said first and second shunts is affixed in said groove with a synthetic resin and rubber glue.

* * * * *